United States Patent [19]

Okura

[11] Patent Number: 4,720,167
[45] Date of Patent: Jan. 19, 1988

[54] LENS BARREL WITH LENS SHUTTER

[75] Inventor: Zenichi Okura, Tokyo, Japan

[73] Assignee: Asahi Kogaku Kogyo Kabushiki Kaisha, Tokyo, Japan

[21] Appl. No.: 801,993

[22] Filed: Nov. 25, 1985

[30] Foreign Application Priority Data

Nov. 30, 1984 [JP] Japan .................. 59-253536

[51] Int. Cl.⁴ .............................................. G02B 7/02
[52] U.S. Cl. ................................................ 350/252
[58] Field of Search ............... 350/252, 255, 429, 430; 354/286

[56] References Cited

U.S. PATENT DOCUMENTS

| | | | |
|---|---|---|---|
| 3,744,884 | 7/1973 | Filipovich et al. | 350/255 |
| 4,166,675 | 9/1979 | Kanno | 350/252 |
| 4,439,018 | 3/1984 | Okajima et al. | 350/430 |

Primary Examiner—John K. Corbin
Assistant Examiner—Loha Ben
Attorney, Agent, or Firm—Sughrue, Mion, Zinn, Macpeak & Seas

[57] ABSTRACT

A lens barrel having a front lens group frame axially movable along its optical axis is stabilized by means of spring elements which urge the frame in a radial direction to a stable position. A rear lens group frame is subsequently radially adjusted so that the optical axis of the rear lens group is in alignment with that of the first lens group.

7 Claims, 5 Drawing Figures

LENS BARREL WITH LENS SHUTTER

BACKGROUND OF THE INVENTION

1. Technical Field

This invention relates to a lens barrel in which the front and rear lens groups are separated from each other by a lens shutter housing.

2. Prior Art

In a lens barrel of this type, the front lens group frame is linearly movable along the optical axis, and the rear lens group frame is secured to the shutter housing. A drive ring is rotatably mounted on the shutter housing. The drive ring has a thrust cam while the front lens group frame has a engagement part which is engaged by the cam, or vice versa. The thrust cam and the engagement part are maintained engaged with each other by spring means adapted to urge the front lens group frame toward the drive ring (or the shutter housing). Therefore, as the drive ring is turned, the front lens group is moved along the optical axis for focus adjustment with the aid of the thrust cam.

In order to impart high optical performance to the lens barrel thus constructed, the optical axis of the front lens group should coincide with that of the rear lens group with high accuracy. However, providing coincidence between the optical axes of the two lens groups is considerably difficult because the two frames are separated from each other by the shutter housing, and the shutter housing itself is made up of a plurality of components. In order to move the front lens group frame toward or away from the shutter housing, there is an engagement clearance between the front lens group frame and the shutter housing. Therefore, the position of the optical axis of the front lens group is changed in the range of the engagement clearance, which lowers the optical performance of the lens barrel. This difficulty may be eliminated by reducing the engagement clearance. However, this method will increase the machining cost and the assembly cost, and accordingly the manufacturing cost of the lens barrel.

SUMMARY OF THE INVENTION

An object of this invention is to eliminate the abovedescribed difficulties accompanying a conventional lens barrel having a lens shutter. More specifically, an object of the invention is to stabilize the position of the optical axis of the front lens group irrespective of the engagement clearance of the front lens group frame. According to the invention, in addition to first spring means for urging the front lens group frame toward the shutter housing, second spring means is provided for urging the front lens group frame in one radial direction. As the front lens group frame is urged in one radial direction, the position of the optical axis of the front lens group is stabilized irrespective of the dimension of the engagement clearance, and therefore the optical performance of the whole lens system is also stabilized.

DETAILED DESCRIPTION OF THE PREFERRED EMBODIMENTS

The invention will be described with reference to the embodiments shown in the accompanying drawings.

Figure 1:
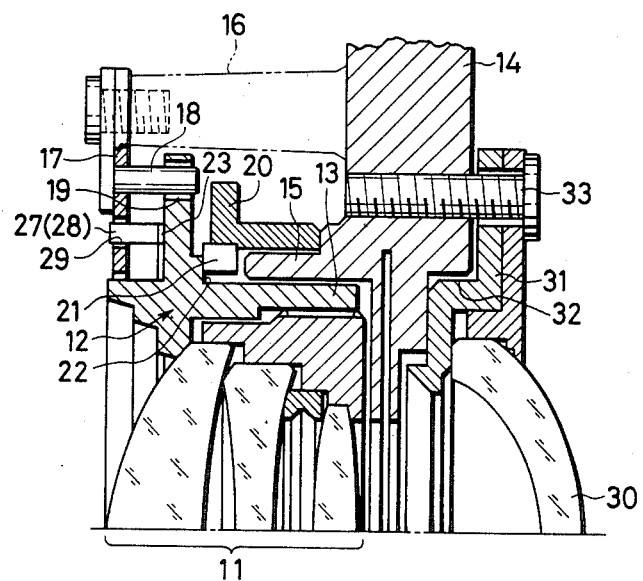
FIG. 1 is a longitudinal sectional view of a first embodiment of the invention.
Figure 2:
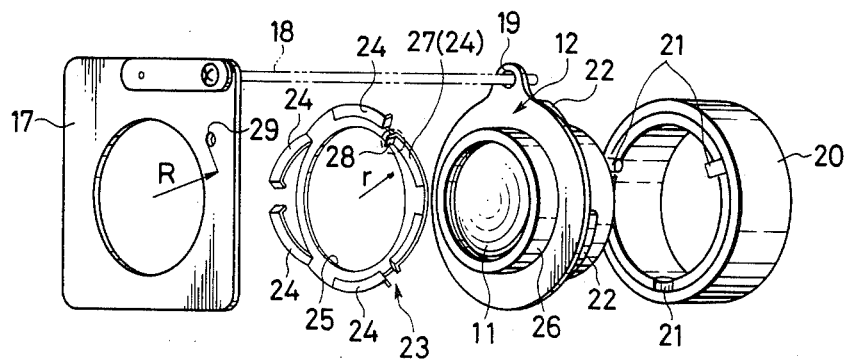
FIG. 2 is an exploded perspective view thereof.
Figure 3:
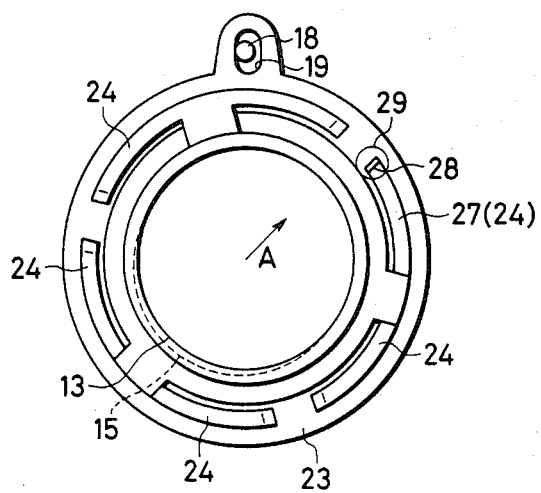
FIG. 3 is a front view showing a retaining leaf spring member and a front lens group frame, for describing the movement of the front lens group frame in a radial direction.

FIGS. 1 through 3 show a first embodiment of the invention. A front lens group frame 12 holding a front lens group 11 has a sliding cylinder 13 which is slidably inserted into the guide cylinder 15 of a shutter housing 14. The shutter housing 14 has a stationary bar 16 which is extended forwardly. A stationary plate (member) 17 is secured to the top of the stationary bar 16. A guide pin 18 is secured to the stationary plate 17 in such a manner that it is in parallel with the optical axis. The guide pin 18 is inserted in an elongated hole 19 in the front lens group frame 12. Therefore, the front lens group 12 is movable along the optical axis although it cannot turn about the optical axis.

A drive ring 20 is rotatably arranged on the guide cylinder 15 of the shutter housing 14. A plurality of cylindrical engagement parts 21 are provided at intervals on the front side of the drive ring 20. Thrust cams 22 are formed on the rear side of the front lens group frame 12 in such a manner that the cams 22 confront the parts 21, respectively. The parts 21 are kept in contact with the thrust cams 22 by a retaining annular leaf spring member 23 which is inserted between the front lens group frame 12 and the stationary plate 17. As is apparent from FIGS. 2 and 3, a plurality of elastic tongue pieces 24 are formed as raised pieces of the retaining leaf spring member 23. The ends of the elastic tongue pieces 24 are brought into contact with the stationary plate 17 while the retaining leaf spring member body is brought into contact with the front side of the front lens group frame 12. Therefore, the front lens group frame 12 is urged towards the drive ring 20 (or the shutter housing 14), and this urging force brings the front lens group frame 12 and the ring 20 in contact with each other. Accordingly, as the drive ring 20 is turned, the front lens group frame 12 is moved along the optical axis according to the configuration of the thrust cams 22.

Figure 2A:
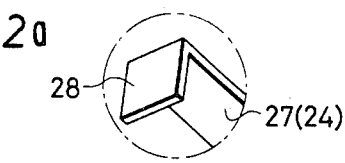
FIG. 2a is an enlarged perspective view of the elastic tongue piece of FIG. 2.

The diameter of the inner circumferential wall 25 of the annular retaining leaf spring member 23 is designed so that it is in close contact with the front cylinder 26 of the front lens group frame 12. That is, the retaining leaf spring member 23 and the front lens group frame 12 are not radially moved relative to each other. One of the elastic tongue pieces 24 of the retaining leaf spring member 23 is bent towards the stationary plate 17, to form a radial elastic tongue piece 27. The bent end part 28, FIG. 2a, of the radial elastic tongue piece 27 is engaged with a fixing hole 29 formed in the stationary plate 17. The distance R between the fixing hole 29 and the optical axis is larger than the distance r between the optical axis and the aforementioned bent front part 28 in its free state. The difference between the two distances is larger than the slide clearance between the sliding cylinder 13 and the guide cylinder 15.

A rear lens group 30 is held by a rear lens group frame 31 which is inserted into an insertion hole 32 in the shutter housing 14 and secured with fixing screws 33. A gap is provided between the insertion hole 32 and the rear lens group frame 31 so that the position of the rear lens group frame can be adjusted in a radial direction.

The lens barrel of the invention is constructed as described above. When the bent part 28 of the radial elastic tongue piece 27 is inserted into the fixing hole 29 of the stationary plate 17, the difference in the aforementioned distances R and r causes the retaining leaf spring member 23, and accordingly the front lens group frame 12, to elastically move in the radial direction shown by the arrow A in FIG. 3. Therefore, the sliding cylinder 13 of the front lens group frame 12 is in contact with the guide cylinder 15 only in the direction of the arrow A, and the elongated hole 19 is stably held in contact with a part of the guide pin 18. This situation is maintained unchanged even when the front lens group frame 12 is moved along the optical axis. Therefore, when the drive ring 20 is turned for focus adjustment, the position of the optical axis of the front lens group system 11 will never become unstable.

The positioning of the rear lens group frame 31 in the radial direction is adjusted so that the optical axis of the front lens group system 11 thus held coincides with the optical axis of the rear lens group system 30. After the adjustment, the rear lens group frame is secured to the shutter housing 14 with the fixing screws 33. As a result, the optical axis of the front lens group system 11 and the optical axis of the rear lens group system 30 coincide with each other with high accuracy at all times.

The radial elastic tongue piece 27 of the retaining leaf spring member 23 may cause the front lens group frame 12 to incline with respect to the optical axis. However, this difficulty can be eliminated by causing the position of the radial elastic tongue piece 27 to substantially coincide with the position of the thrust cam 22. More specifically, since the thrust cams 22 are pushed in the direction of the optical axis by the parts 21, the retaining leaf spring member 23 and accordingly the front lens group frame 12 will not be inclined in the direction of the optical axis by the radial elastic tongue piece 27.

Figure 4:
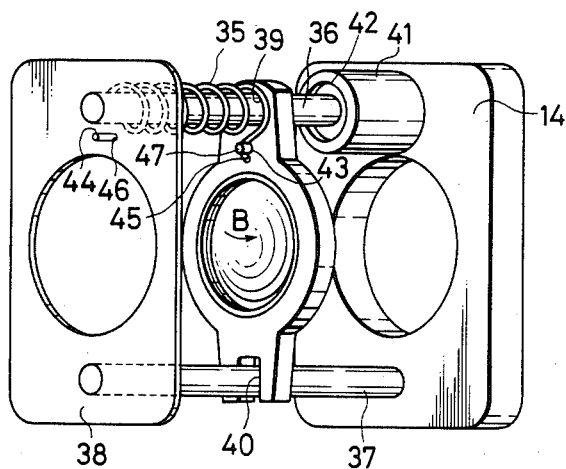
FIG. 4 is a perspective view showing essential components of a second embodiment of the invention.

FIG. 4 shows a second embodiment of the invention. In this embodiment, one torsion coil spring 35 is used to urge the front lens group 12 in the direction of the optical axis and in a radial direction. The upper and lower guide shafts 36 and 37 are secured to the shutter housing 14 in such a manner that they are in parallel with the optical axis. A stationary plate (member) 38 is secured to the ends of the guide shafts 36 and 37. The front lens group frame 12 has a sliding hole 39 into which the guide shaft 36 is slidably inserted, and an elongated groove 40 with which the guide shaft 37 is engaged, so that the front lens group frame 12 is movable along the optical axis. A drive ring 41 is placed on the guide shaft 36 on the side of the shutter housing 14. The end of the drive ring 41 is formed into a thrust cam 42. Part 43 is secured to the front lens group frame 12 so as to confront the thrust cam.

The aforementioned torsion coil spring 35 serves both as a compression spring and a torsion spring. The spring 35, after being compressed, is placed on that part of the guide shaft 36 between the stationary plate 38 and the front lens group frame 12, in order to urge the front lens group frame 12 towards the drive ring 41 (or the shutter housing 14). Then, with the torsion coil spring 35 twisted, hooks 44 and 45 at its ends are engaged with a locking hole 46 in the stationary plate 38 and a locking pin 47 on the front lens group frame 12, respectively, to impart torque to the front lens group frame 12 to turn the latter about the guide shaft 36 in the direction of the arrow B in FIG. 4. The direction indicated by arrow B is substantially equivalent to the radial direction of the front lens group system 11. Therefore, similarly to the first embodiment, the position of the optical axis of the front lens group 11 can be stabilized with respect to the shutter housing 14. Focus adjustment using the drive ring 41, and adjustment of the rear lens group frame 31, are carried out in the same manner as in the first embodiment.

As is apparent from the above description, in the lens barrel according to the invention, the front lens group frame is urged towards the shutter housing in a radial direction, and therefore the position of the optical axis of the front lens group will not be changed in the radial direction by the slide clearance between the front lens group frame and the shutter housing. Therefore, if adjustment is made so that the optical axis of the rear lens group frame coincides with that of the front lens group frame, then the lens system can achieve excellent optical performance as a whole. Furthermore, if the spring means which radially urges the front lens group frame is designed so as to also serve to urge the front lens group frame towards the shutter housing, then the space required for the installation of spring members can be reduced.

What is claimed is:

1. In a lens barrel including a lens shutter in which a front lens group frame is supported in front of a shutter housing such that said front lens group frame is linearly movable along an optical axis, and wherein a rear lens group frame is fixed in the rear of said shutter housing, the improvement comprising;

first spring means for urging said front lens group frame towards said shutter housing, and second spring means for urging said front lens group frame in a radial direction, said first and second spring means being provided between a stationary member integral with said shutter housing, and said front lens group frame.

2. A lens barrel as claimed in claim 1, in which said first and second spring means are comprised of a single spring member.

3. A lens barrel as claimed in claim 2, wherein said spring member comprises a leaf spring member supported on said front lens group frame so as to inhibit radial movement thereof, elastic tongue means abutted against said stationary member to urge said front lens group frame towards said shutter housing, and radial tongue means having one end locked to said stationary member for urging said front lens group frame in said radial direction, said elastic tongue means and said radial tongue means being formed as raised pieces of said leaf spring member.

4. A lens barrel as claimed in claim 2, wherein said spring member comprises a torsion coil spring for urging said front lens group frame towards said shutter housing via a compressive force and for urging said front lens group frame in said radial direction via a torsional force.

5. A lens barrel as claimed in claim 1, wherein said first spring means comprises a plurality of leaf spring elements for urging said front lens group frame toward said shutter housing, and said second spring means comprises a leaf spring element compressible or extendable in a radial direction, and lockingly engaged with at least one of said stationary member and said front lens group frame.

6. A lens barrel as claimed in claim 2, wherein said single spring member comprises a torsion coil spring having opposite ends locked respectively to said stationary member and said front lens group frame for radially urging said front lens group frame in a first direction, and for axially urging said front lens group frame in a direction along the axis of said spring member.

7. A lens barrel as claimed in claim 1, wherein said rear lens group frame is connected to said shutter housing by a radially adjustable connection so that said rear lens group may be optically aligned with said front lens group.

* * * * *